(12) United States Patent
Hemenway et al.

(10) Patent No.: US 7,423,818 B2
(45) Date of Patent: Sep. 9, 2008

(54) METHOD OF SUPPRESSING DISTORTION OF A WORKING LASER BEAM OF A LASER LINK PROCESSING SYSTEM

(75) Inventors: David Martin Hemenway, Beaverton, OR (US); Brady Nilsen, Beaverton, OR (US); Ho Wai Lo, Portland, PR (US); Keith Grant, Aloha, OR (US)

(73) Assignee: Electro Scientific Industries, Inc., Portland, OR (US)

( * ) Notice: Subject to any disclaimer, the term of this patent is extended or adjusted under 35 U.S.C. 154(b) by 302 days.

(21) Appl. No.: 11/440,696

(22) Filed: May 24, 2006

(65) Prior Publication Data

US 2007/0012667 A1    Jan. 18, 2007

Related U.S. Application Data

(60) Provisional application No. 60/700,031, filed on Jul. 15, 2005.

(51) Int. Cl.
*G02B 3/00* (2006.01)

(52) U.S. Cl. .......................... 359/738; 359/305; 359/641
(58) Field of Classification Search ................. 359/285, 359/305, 641, 559–562, 738
See application file for complete search history.

(56) References Cited

U.S. PATENT DOCUMENTS

| 3,794,406 | A  | * | 2/1974 | Kock et al. .................... 359/15 |
| 5,020,111 | A  | * | 5/1991 | Weber ........................ 382/211 |
| 5,642,183 | A  |   | 6/1997 | Sugihara et al. ............... 355/71 |
| 6,178,045 | B1 |   | 1/2001 | Cook et al. .................. 359/559 |
| 6,888,875 | B2 | * | 5/2005 | Hayakawa ................... 372/108 |

FOREIGN PATENT DOCUMENTS

EP    0822404 A2    4/1998

\* cited by examiner

*Primary Examiner*—Ricky Mack
*Assistant Examiner*—James R Greece
(74) *Attorney, Agent, or Firm*—Stoel Rives LLP (57) ABSTRACT

A method of suppressing distortion of a working laser beam directed for incidence on a target specimen presented for processing by a laser link processing system uses a spatial filter to remove stray light-induced distortion from the working laser beam.

16 Claims, 7 Drawing Sheets

METHOD OF SUPPRESSING DISTORTION OF A WORKING LASER BEAM OF A LASER LINK PROCESSING SYSTEM

RELATED APPLICATION

This application claims benefit of U.S. Provisional Patent Application No. 60/700,031, filed Jul. 15, 2005.

COPYRIGHT NOTICE

© 2006 Electro Scientific Industries, Inc. A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR § 1.71 (d).

TECHNICAL FIELD

This invention relates to laser link processing and, in particular, to techniques for suppressing distortion of a working laser beam directed to perform link processing of a semiconductor target specimen.

SUMMARY OF THE DISCLOSURE

A method of suppressing distortion of a working laser beam directed for incidence on a target specimen that is presented for processing by a laser link processing system removes stray light-induced distortion from the working laser beam. The working laser beam is derived from a laser output beam propagating from a laser and attenuated by an attenuator, both of which form parts of the laser link processing system. When the distortion suppression method is not practiced, the distortion of the working laser beam generally increases in predominance in response to increasing amounts of attenuation of the laser output beam.

Preferred embodiments of the method entail directing the laser output beam through the attenuator to form an attenuator output beam and providing a spatial filter that includes a focus lens and an aperture. The attenuator output beam is directed to the focus lens to form a focused beam at a focal region that is associated with the focus lens. The focused beam includes a primary beam component and a stray light component, the latter of which resulting from link processing system scattered light combining with the attenuator output beam. The primary beam component focuses to a spatial frequency, and the stray light component focuses to a spatial frequency that is higher than the spatial frequency of a primary beam component. The aperture of the spatial filter is positioned at or near the focal region to allow the primary beam component to pass unobstructed and to block the stray light components, and thereby removes stray light-induced distortion from the working laser beam.

Additional aspects and advantages will be apparent from the following detailed description of preferred embodiments, which proceeds with reference to the accompanying drawings.

BRIEF DESCRIPTION OF THE DRAWINGS

FIGS. 3A-1, 3A-2, 3B-1, 3B-2, 3C-1, 3C-2, 3D-1, and 3D-2 show the impact of increasing attenuation of a laser output beam on scanning light reflected by a target specimen of FIGS. 2A and 2B.

FIGS. 6A-1, 6A-2, 6B-1, 6B-2, 6C-1, 6C-2, 6D-1, and 6D-2 show the effect of the spatial filter assembly used in the laser processing system of FIG. 4 to suppress distortion of scanning light reflected by alignment targets on the work surface of the semiconductor wafer specimen of FIGS. 2A and 2B.

DETAILED DESCRIPTION OF PREFERRED EMBODIMENTS

Figure 1:
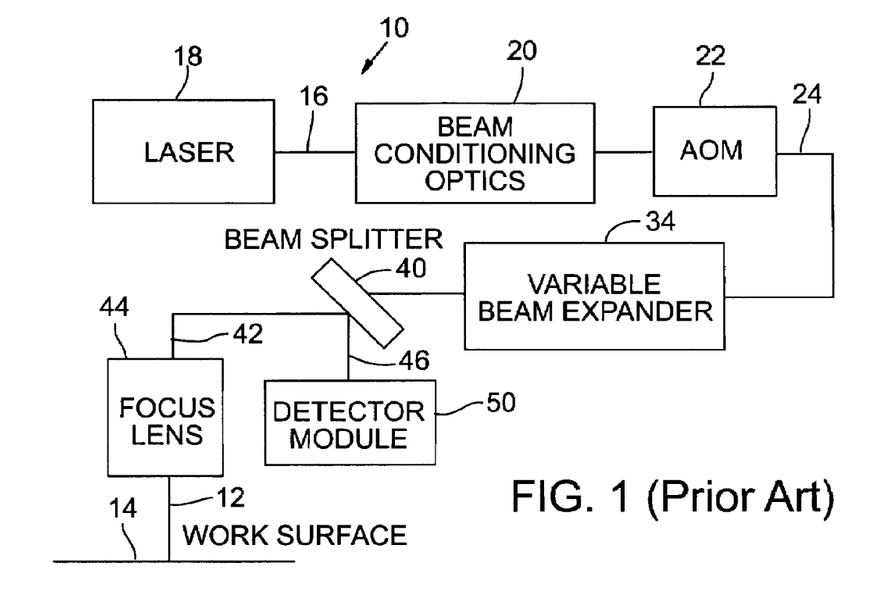
FIG. 1 is a block diagram of a conventional laser link processing system.

FIG. 1 is a block diagram of a conventional laser link processing system 10 that produces a working laser beam 12 directed for incidence on a work surface 14 of a target specimen. Working laser beam 12 is derived from an output beam 16 emitted by a laser 18, preferably by harmonic generation to achieve a desired wavelength of output beam 16 and thereby form a desired working laser beam spot size. Harmonic generation can be accomplished by use of harmonic wavelengths of the fundamental infrared (IR) wavelength of a solid-state laser or fiber laser typically operating in the 900 nm-1,500 nm range. Lasers emitting light in this IR wavelength range are currently used in laser link processing systems such as a Model 9830, manufactured by Electro Scientific Industries, Inc., which is the assignee of this patent application. Shorter harmonic wavelengths intended for use in link processing include wavelengths below about 532 nm such as, for example, 355 nm in the ultraviolet (UV) range.

Figure 2A:
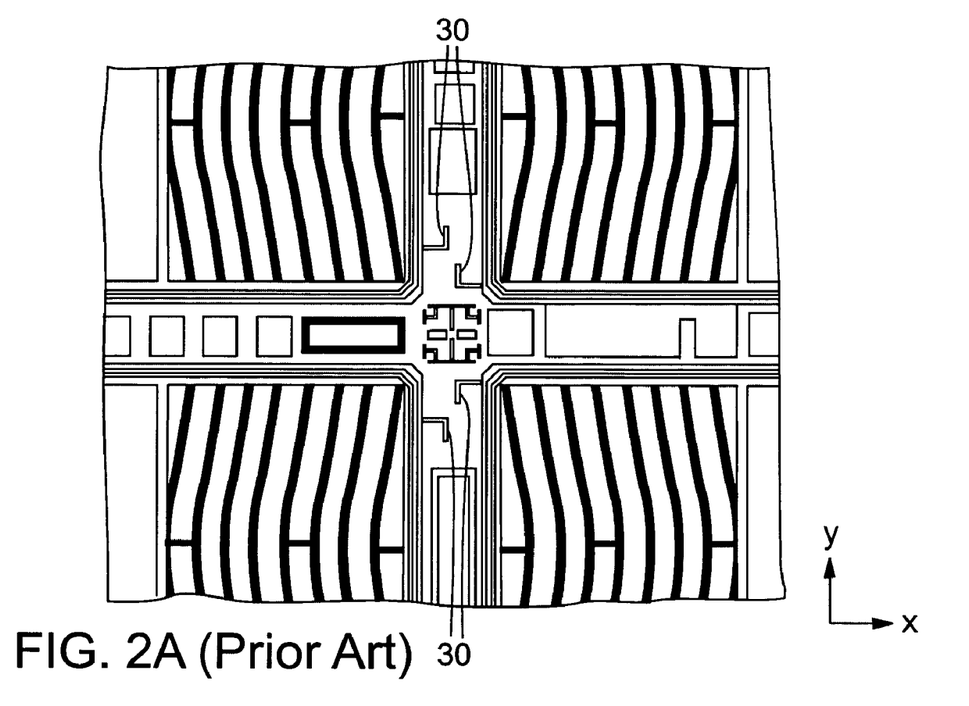
FIGS. 2A and 2B show with different image magnifications alignment targets on the work surface of a semiconductor wafer specimen presented for processing by the laser link processing systems of FIGS. 1 and 4.
Figure 2B:
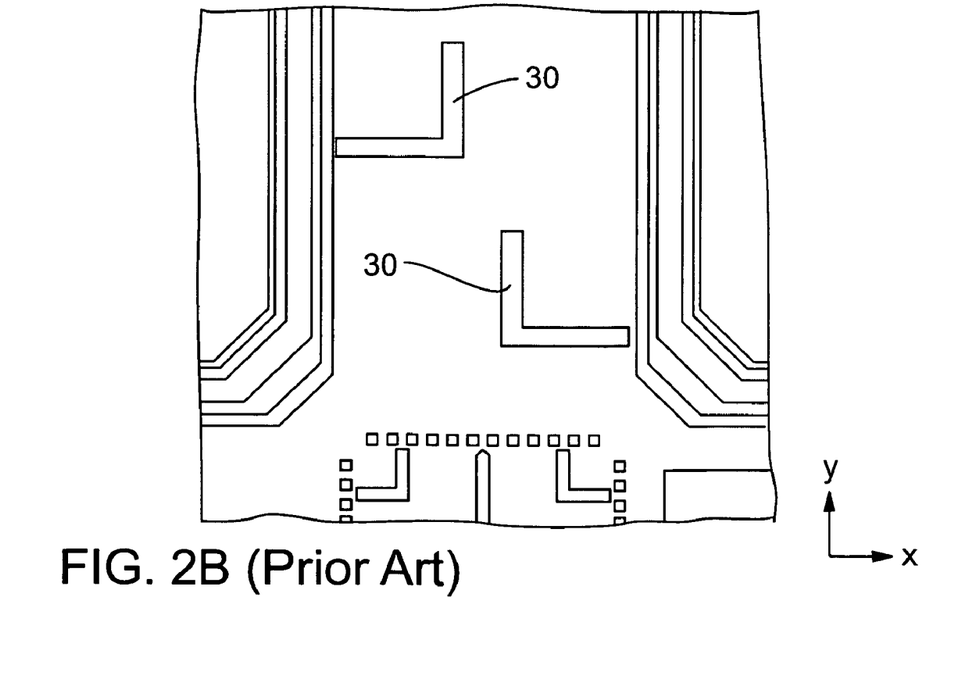

Laser output beam 16 propagates through a beam conditioning optical component module 20, which establishes optical properties of laser output beam 16 that make it suitable for incidence on an acousto-optic modulator (AOM) 22, which functions selectively as a Bragg angle controllable attenuator or a light shutter. AOM attenuator 22 produces an attenuator output beam 24 that constitutes an attenuated version of laser output beam 16. In the alignment target scanning operation of link processing, AOM attenuator 22 is used to form from laser output beam 16 a working laser beam 12 of reduced power for use in scanning without changing the physical properties of specimen alignment targets in the form of multiple L-shaped 10 μm wide scan stripes 30. FIGS. 2A and 2B show with different image magnifications alignment targets on work surface 14 of a semiconductor wafer. The alignment targets are composed of L-shaped scan stripes 30, each having segments in the x- and y-axis scan directions. Incident scanning light reflected by scan stripes 30 is detected and provides alignment information relating to the specimen. A scanning operation is accomplished by imparting relative movement between scan stripes 30 and working laser beam 12 of reduced power. Configuring system 10 to perform a scanning operation entails expanding attenuator output beam 24 by a variable beam expander 34 and directing its output to a beamsplitter 40. A scanning component propagating along a beam path segment 42 from beamsplitter 40 is converged by a focus lens 44 to form working beam 12 of reduced power. Working beam 12 functioning as scanning light is reflected by stripes 30 and propagates back through focus lens 44 to reflect off of beamsplitter 40 and form a detection component propagating along a beam path segment 46 for incidence on a detector module 50.

Figure 3A:
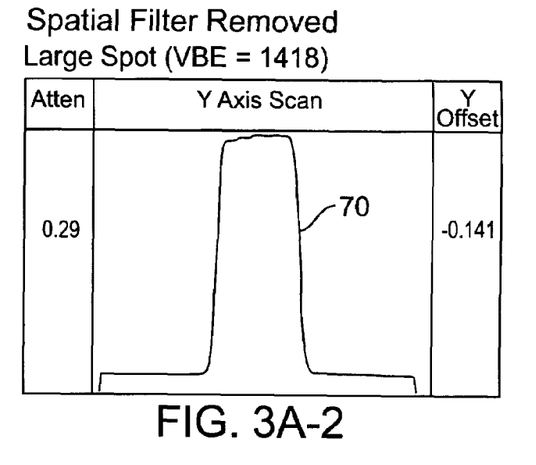
Figure 3A:
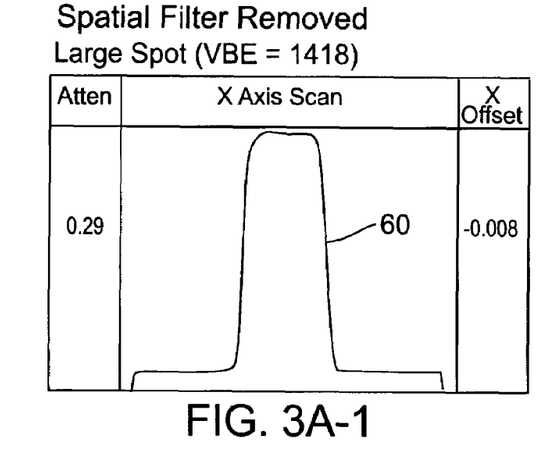
Figure 3B:
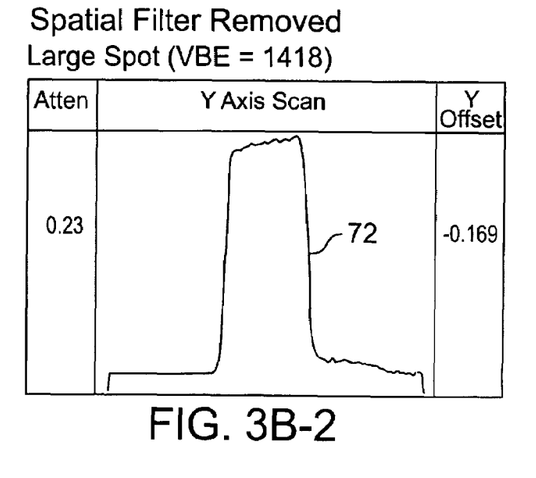
Figure 3B:
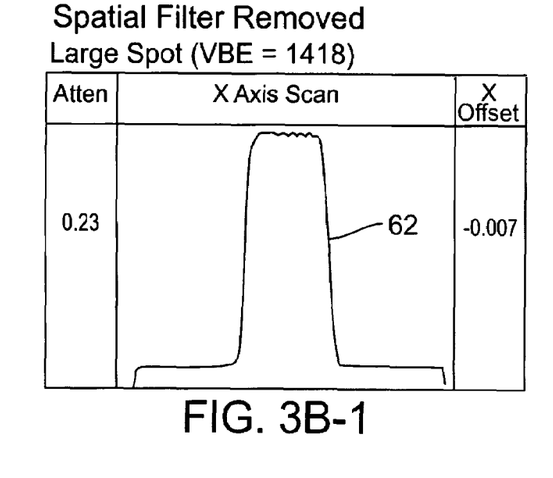
Figure 3C:
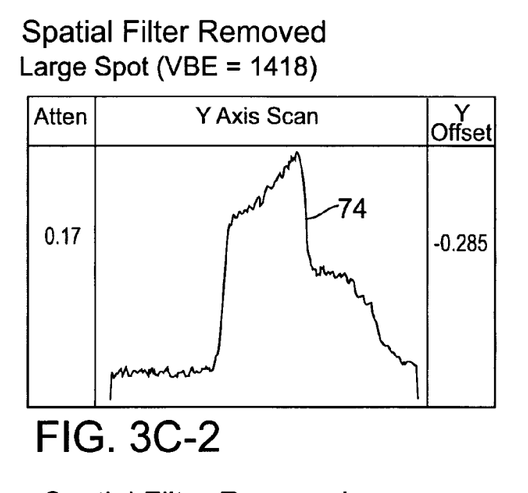
Figure 3C:
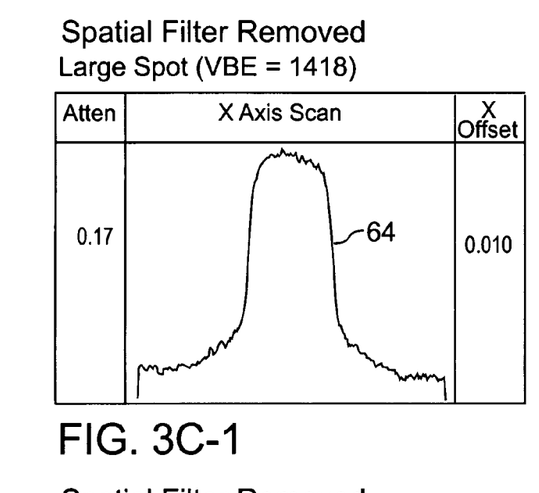
Figure 3D:
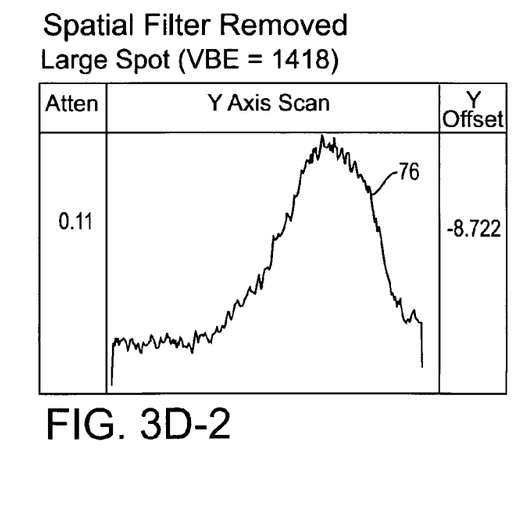
Figure 3D:
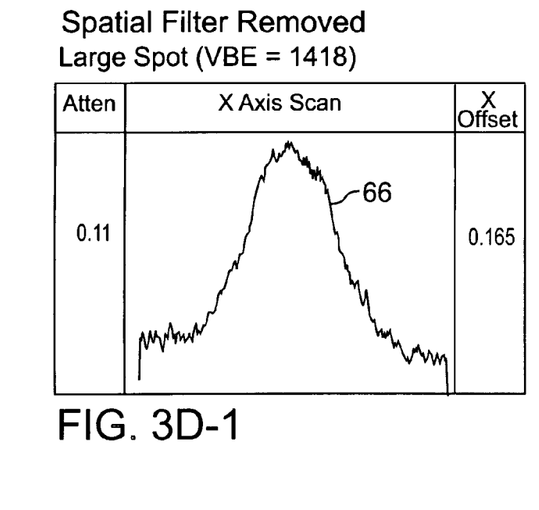

During their research and development activities, applicants noted that increasing amounts of attenuation imparted by AOM attenuator 22 to laser output beam 16 of Gaussian beam intensity distribution or profile resulted in increasing distortion of the scanning light reflected by scan stripes 30 and detected by detector module 50. FIGS. 3A-1, 3A-2, 3B-1, 3B-2, 3C-1, 3C-2, 3D-1, and 3D-2 show the impact of increasing attenuation of laser output beam 16 on the reflected scanning light. The usable attenuation range was determined empirically. FIGS. 3A-1 and 3A-2 show respective x- and y-axis scans of scan stripes 30 at minimum attenuation (maximum transmission), which was set just below the target material damage threshold. FIGS. 3D-1 and 3D-2 show the respective x- and y-axis scans of scan stripes 30 at maximum attenuation (minimum transmission), which was set by the detection sensitivity limit of detector module 50. FIGS. 3B-1 and 3C-1 and FIGS. 3B-2 and 3C-2 show respective x- and y-axis scans of scan stripes 30 at mid-range attenuation amounts equally spaced between the attenuation amounts represented by FIGS. 3A-1 and 3A-2 and FIGS. 3D-1 and 3D-2. The reflected light pulses are shown with the same amplitudes because of autoscale display normalization; therefore, the scale is not the same in the drawing figures representing different attenuation amounts. It is desirable to use a laser scanning beam of lowest possible power to accommodate scan stripes 30 of different materials having different associated damage thresholds.

FIGS. 3A-1, 3B-1, 3C-1, and 3D-1 show, in response to increasing amounts of attenuation of working laser beam 12, progressive distortion of the reflected light pulses produced by x-axis alignment target scans. FIG. 3A-1 shows a reflected light pulse 60 with distortion introducing a −0.008 μm x-axis offset; FIG. 3B-1 shows a reflected light pulse 62 with distortion introducing a −0.007 μm x-axis offset; FIG. 3C-1 shows a reflected light pulse 64 with a distortion introducing a +0.010 μm x-axis offset; and FIG. 3D-1 shows a reflected light pulse 66 with distortion introducing a +0.0165 μm x-axis offset.

FIGS. 3A-2, 3B-2, 3C-2, and 3D-2 show, in response to increasing amounts of attenuation of working laser beam 12, progressive distortion of the reflected light pulses produced by y-axis alignment target scans. FIG. 3A-2 shows a reflected light pulse 70 with distortion introducing a −0.141 μm y-axis offset; FIG. 3B-2 shows a reflected light pulse 72 with distortion introducing a −0.169 μm y-axis offset; FIG. 3C-2 shows a reflected light pulse 74 with distortion introducing a −0.285 μm y-axis offset; and FIG. 3D-2 shows a reflected light pulse 76 with distortion introducing a −8.722 μm y-axis offset.

Asymmetry and offset of the reflected light pulses introduce alignment errors because algorithms implemented in detector module 50 are formulated to process a symmetrical, centered input pulse waveform. Analysis of the above-described drawing figures reveals that, for increasing amounts of attenuation, distortion of reflected light pulses 70, 72, 74, and 76 relating to y-axis scanning is more pronounced than that of reflected light pulses 60, 62, 64, and 66 relating to x-axis scanning. Such beam-to-work (BTW) scan quality problems arise with large attenuator output beam 24 spot sizes and high attenuation. Applicants traced the BTW scan quality problems to the presence of a stray low-intensity beam that is not affected by AOM attenuator 22. The stray beam is almost coincident with the primary scanning beam, usually exactly coincident in the x axis and slightly off-center in the y axis. At high attenuation of laser output beam 16, the intensity of the stray beam is sufficient to cause alignment errors when scanning alignment targets. Sources of the stray beam are the optical components with which the laser beam comes into contact. Lasers operating at their harmonic wavelengths suffer mode quality degradation resulting from nonlinear optics used. Lasers implementing harmonic generation to achieve shorter wavelengths cannot be focused to a corresponding theoretically possible small spot size because of mode quality degradation resulting from superposition of scattered light (i.e., stray beam) on the Gaussian main beam. Superposition of scattered light also impedes measurement of the actual spot size of a laser beam, thereby resulting in a measurement of only a perceived laser spot size.

Figure 4:
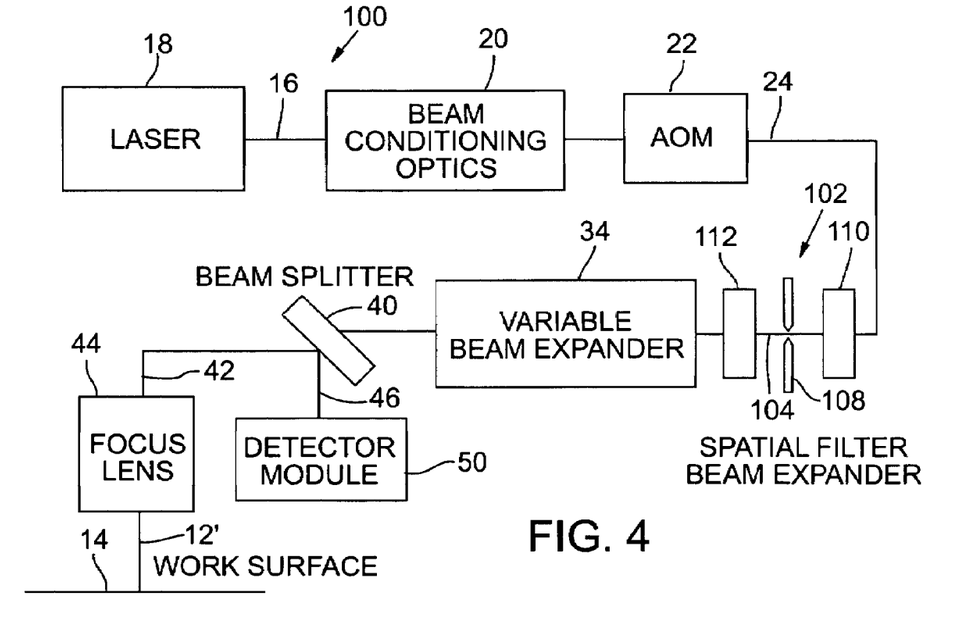
FIG. 4 is a block diagram of a laser link processing system configured to carry out a preferred method of suppressing distortion of a working laser beam directed for link processing of a target specimen.
Figure 5:
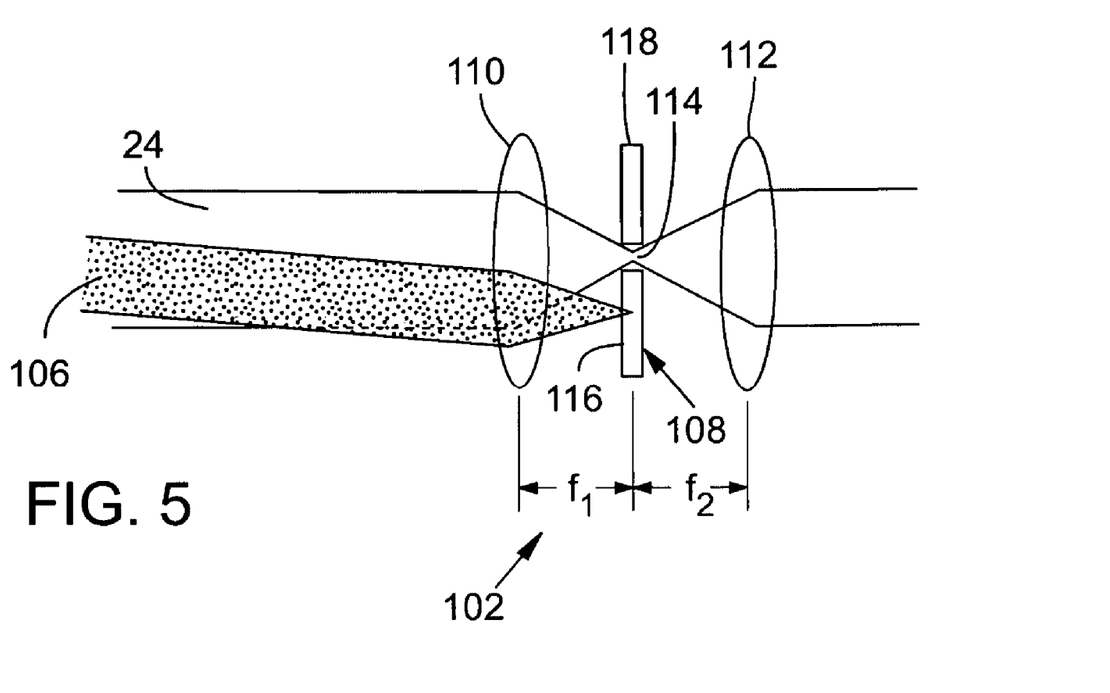
FIG. 5 is a diagram showing in cross-section a spatial filter assembly included in the laser link processing system of FIG. 4.
Figure 6A:
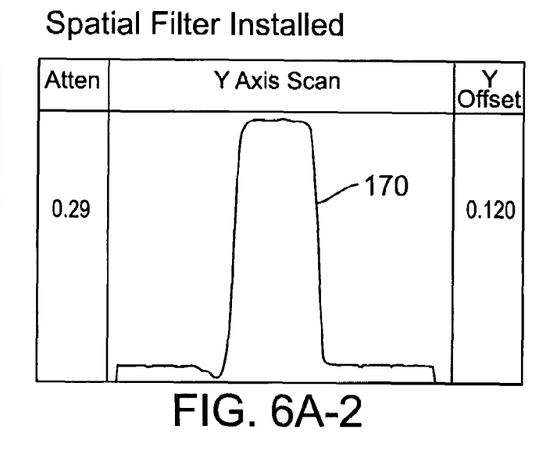
Figure 6A:
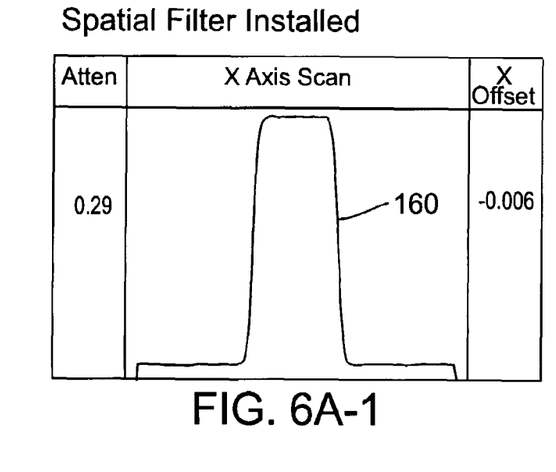
Figure 6B:
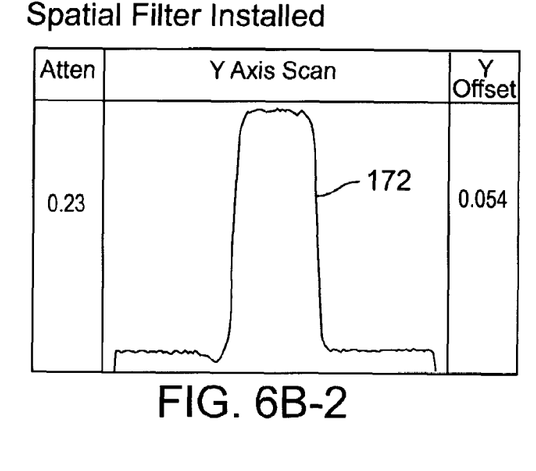
Figure 6B:
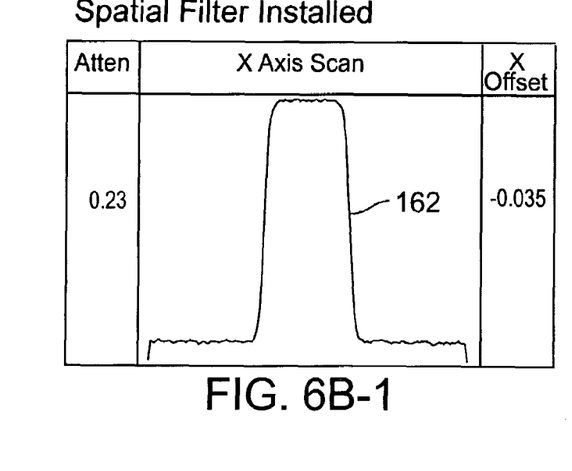
Figure 6C:
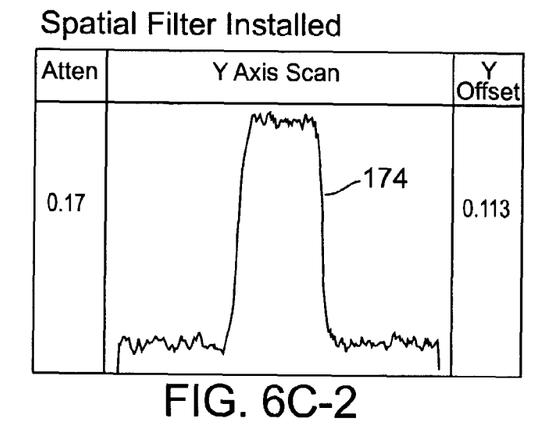
Figure 6C:
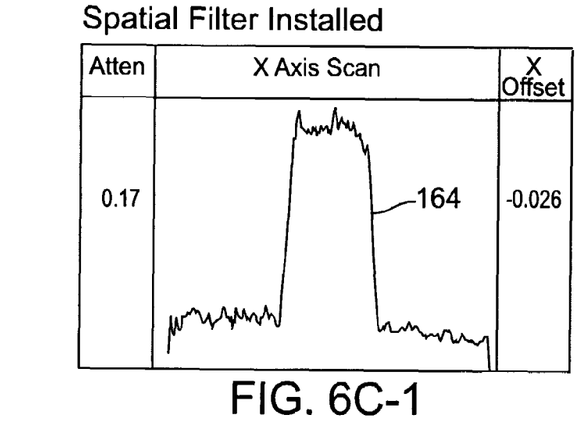
Figure 6D:
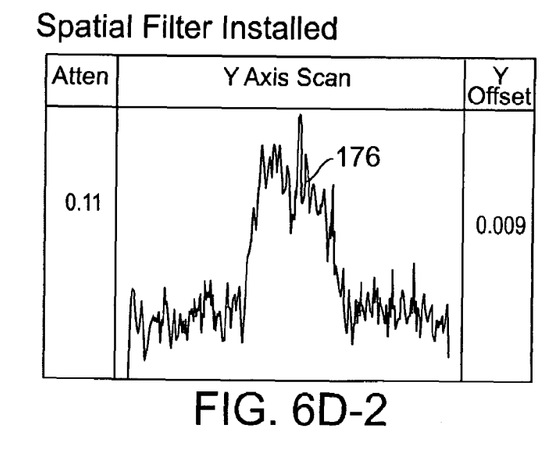
Figure 6D:
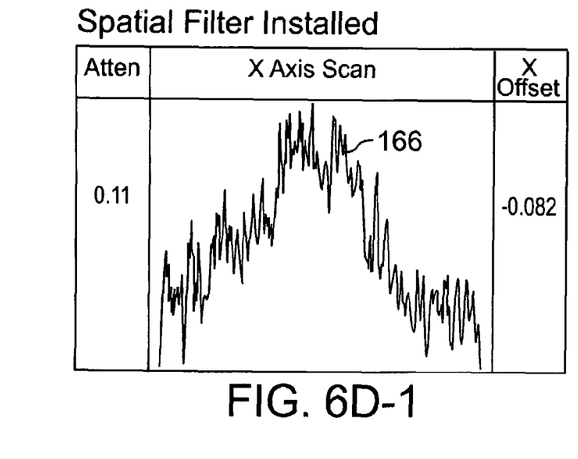

FIG. 4 is a block diagram of a laser link processing system 100 configured to carry out a preferred method of suppressing distortion of a working laser beam 12' that is incident on work surface 14 of a target specimen. FIG. 4 differs from FIG. 1 only in that a spatial and beam expander assembly ("spatial filter assembly") 102 is provided in a beam path 104 between AOM attenuator 22 and variable beam expander 34. Corresponding components of FIGS. 1 and 4 are identified by common reference numerals initially given with reference to FIG. 1. FIG. 5 is a diagram showing in cross-section spatial filter assembly 102 receiving as incident light the attenuator output beam 24 and a stray light beam 106.

With reference to FIGS. 4 and 5, spatial filter assembly 102 positioned in beam path 104 removes or appreciably reduces the impact of stray beam 106 and any satellites because they focus to higher spatial frequencies than the frequency of attenuator output beam 24. (Stray beam 106 represents one or more stray light beam components at the wavelength of interest (i.e., the wavelength of laser output beam 16); and satellites represent additional noise near, but not at, the wavelength of interest.) Spatial filter assembly 102 includes an aperture 108 positioned between a focus lens 110 having focal length, $f_1$, and a collimating lens 112 having a focal length, $f_2$. Aperture 108 has an orifice 114 of diameter, d, surrounded by an opaque region 116. Aperture 108 is set at or near a focal region 118 of $f_1$ (i.e., the Fourier transform plane), establishing the beam waist of attenuator output beam 24. The proximity of placement of aperture 108 is established by that which provides adequate separation between attenuator output beam 24 and stray light beam 106 to pass the former and block the latter. Orifice 114 may be symmetrical about or offset from beam path 104, depending on the location of the higher spatial frequency orders of light that is to be blocked.

Attenuator output beam 24 focused by focus lens 110 exhibits at focal region 118 a sufficiently small spot size that approaches the diffraction limit (i.e., less than two wavelengths) of attenuator output beam 24. Spatial filter assembly 102 focuses light downwardly away from orifice 114, using opaque region 116 of aperture 108 to block the higher spatial frequency effects and allow the Gaussian attenuator output beam 24 to pass unobstructed. Moreover, aperture 108 may be slightly changed to block more of the light of attenuator output beam 24 and thereby allow only a central portion of the Gaussian beam to propagate. This change to aperture 108 would make possible an external increase in effective mode quality of attenuator output beam 24 so that it may be more tightly focused to produce a smaller spot size for working laser beam 12'. Focus lens 110 converges attenuator output beam 24 for propagation through orifice 114 of aperture 108 and stray light beam 106 downwardly for blockage by opaque region 116. Collimating lens 112 expands the attenuator output beam 24 from its formed beam waist, which beam 24 propagates for incidence on variable beam expander 34.

FIGS. 6A-1, 6A-2, 6B-1, 6B-2, 6C-1, 6C-2, 6D-1, and 6D-2 and their corresponding respective FIGS. 3A-1, 3A-2, 3B-1, 3B-2, 3C-1, 3C-2, 3D-1, and 3D-2 provide a comparative relationship of the reflected scanning light developed in laser link processing systems 10 and 100. (Identical letter suffices correspond to the same amounts of attenuation, and identical numerical suffices correspond to the same scan axis directions.) Reflected light pulses 160, 162, 164, and 166 of FIGS. 6A-1, 6B-1, 6C-1, and 6D-1 introduce, respectively, −0.006 μm, −0.035 μm, −0.026 μm, and −0.082 μm x-axis offsets. Reflected light pulses 170, 172, 174, and 176 of FIGS. 6B-1, 6B-2, 6B-3, and 6B-4 introduce, respectively, +0.120 μm, +0.054 μm, +0.113 μm, and +0.009 μm y-axis offsets. Comparison of the corresponding x-axis and y-axis offsets reveals that the presence of spatial filter assembly 102 provides significant beam quality improvement in the operation of system 100.

Removing the abnormalities from attenuator output beam 24 can suppress from working laser beam 12' the negative effects induced by shorter wavelength lasers to link processing by increasing the signal-to-noise ratio on BTW scans, eliminating exposure effects during idle times (stray light can anneal target surface), and eliminating noise in a Gaussian beam intensity profile to allow smaller and more symmetrical focused spots of working laser beam 12'. Removing such abnormalities also provides actual laser spot size measurement of greater accuracy.

It will be obvious to those having skill in the art that many changes may be made to the details of the above-described embodiments without departing from the underlying principles of the invention. Although the preferred embodiment described processes UV wavelengths of light, other embodiments of the method would be applicable to IR wavelengths of light. The scope of the present invention should, therefore, be determined only by the following claims.

The invention claimed is:

1. A method of suppressing distortion of a working laser beam directed for incidence on a target specimen presented for processing by a laser link processing system, the working laser beam derived from a laser output beam propagating from a laser and attenuated by an attenuator, both of which forming parts of the laser link processing system, the distortion of the working laser beam generally increasing in predominance in response to increasing amounts of attenuation of the laser output beam, comprising:

directing the laser output beam through the attenuator to form an attenuator output beam;

providing a spatial filter including a focus lens and an aperture;

directing the attenuator output beam to the focus lens to form a focused beam at a focal region associated with the focus lens, the focused beam including a primary beam component and a stray light component, the stray light component resulting from link processing system scattered light combining with the attenuator output beam, and the primary beam component focusing to a spatial frequency and the stray light component focusing to a spatial frequency higher than the spatial frequency of the primary beam component; and positioning the aperture at or near the focal region to allow the primary beam component to pass unobstructed and to block the stray light components, thereby to remove stray light-induced distortion from the working laser beam.

2. The method of claim 1, in which the laser output beam is formed by harmonic generation to achieve a desired wavelength of the laser output beam.

3. The method of claim 2, in which the desired wavelength is within a wavelength range of between about 266 nm and about 532 nm.

4. The method of claim 1, in which the primary beam component has a beam intensity distribution of substantially Gaussian shape.

5. The method of claim 4, in which the primary beam component of Gaussian shape includes a central portion that passes unobstructed through the aperture.

6. The method of claim 1, in which the attenuator includes an acousto-optic modulator and the stray light component is substantially unaffected by operation of the acousto-optic modulator to form the attenuator output beam.

7. The method of claim 1, in which the stray light component is substantially unaffected by operation of the attenuator to form the attenuator output beam.

8. The method of claim 1, in which the primary beam component propagates along a beam axis, and in which the aperture is positioned generally symmetrically about the beam axis.

9. The method of claim 1, in which the primary beam component propagates along a beam axis, and in which the aperture is positioned substantially on one side of the beam axis.

10. The method of claim 1, in which the aperture has an orifice and the focal region includes a focal point, and in which the orifice is positioned substantially at the focal point.

11. The method of claim 1, in which the focused beam exhibits at the focal region a sufficiently small spot size that approaches the diffraction limit of the attenuator output beam.

12. The method of claim 1, in which the primary beam component has a beam waist, and in which the aperture is positioned to allow the beam waist of the primary beam component to pass unobstructed.

13. The method of claim 12, further comprising collimating the primary beam component from the beam waist.

14. The method of claim 1, in which the processing of the working laser beam includes scanning alignment targets provided on the target specimen.

15. The method of claim 14, in which, in absence of the spatial filter, the operation of the attenuator to form the attenuator output beam results in alignment errors in response to increasing amounts of attenuation imparted to the laser output beam that increases intensity values of the stray light component relative to the intensity of the primary beam component.

16. The method of claim 1, in which, in absence of the spatial filter, the operation of the attenuator to form the attenuator output beam results in distortion of laser output beam spot size in response to increasing amounts of attenuation imported to the laser output beam and thereby degrades accuracy of a spot size measurement of the working laser beam.

* * * * *